United States Patent [19]

Spurgeon

[11] Patent Number: 4,702,774

[45] Date of Patent: Oct. 27, 1987

[54] ACTIVATOR FLUID FOR WATER REMOISTENABLE GLUE

[76] Inventor: Roger Spurgeon, 1735 Kingsway Dr., Xenia, Ohio 45385

[21] Appl. No.: 874,417

[22] Filed: Jun. 16, 1986

[51] Int. Cl.$^4$ ............................................... C09K 3/00
[52] U.S. Cl. ............................ 106/287.24; 156/441.5
[58] Field of Search .................. 106/287.24; 604/36, 604/37, 212, 54; 426/650

[56] References Cited

U.S. PATENT DOCUMENTS 3,905,325 9/1975 Labore et al. .................. 156/441.5
3,949,067 4/1976 Gibbs ................................ 424/73
4,450,037 5/1984 Gavronsky ...................... 156/441.5

*Primary Examiner*—Theodore Morris
*Attorney, Agent, or Firm*—Killworth, Gottman, Hagan & Schaeff

[57] ABSTRACT

An activator fluid for a water remoistenable glue is provided. The fluid includes an effective amount of acetic acid and water and may optionally include a fragrance and coloring matter. The activator fluid rapidly wets and penetrates the surface of remoistenable glue layers and may be used on automatic envelope flap moistening and sealing devices to ensure proper moistening and sealing of envelopes and the like.

5 Claims, No Drawings

ACTIVATOR FLUID FOR WATER REMOISTENABLE GLUE

BACKGROUND OF THE INVENTION

The present invention relates to fluids for activating water remoistenable glues, and more particularly to a water-based activator fluid for remoistening the glue on envelopes, tapes, and other packaging materials.

Automated envelope flap moistening and sealing devices have been used for many years. Some of these devices have been combined with automatic postage meters so that an envelope may be moistened, sealed and postage plied in one operation. Examples of such prior art moistening and sealing devices include Labore et al, U.S. Pat. No. 3,905,325 and Gavronsky, U.S. Pat. No. 4,450,037.

Heretofore, such automatic moistening devices have utilized water to remoisten the glue found on envelope flaps. However, in many instances, envelope glue has a film or crust on its surface which resists wetting by water. Accordingly, in some instances, for example during mass mailing operations, the application of water to envelope flaps has been ineffective to wet and/or penetrate this surface layer on the glue resulting in some mail being processed without being properly sealed. It can be appreciated that the contents of improperly sealed mail may be lost. Even if an operator intercepts unsealed or improperly sealed mail before it is sent, the mail must be either manually sealed or recycled back through the automated sealing procedure.

Accordingly, there exists a need in the art for a water based activator fluid which has an improved ability to wet and penetrate the surface of remoistenable glue layers to ensure that envelope flaps are properly sealed during mailing operations. The present invention is directed to this need.

SUMMARY OF THE INVENTION

The present invention meets this need by providing an activator fluid for a water remoistenable glue which includes an effective amount of acetic acid and water. Optionally, the activator fluid may also contain one or more fragrances and coloring matter.

A preferred source of acetic acid for the activator fluid is commercial vinegar which contains approximately 4-5% acetic acid by volume. It has been found that only a very small amount of acetic acid is required in the activator fluid to aid the water based fluid in wetting and penetrating the surface of most commercially utilized water remoistenable glues. This effective amount of acetic acid has been found to be between 0.04 to about 0.12% by volume.

Accordingly, it is an object of the present invention to provide an activator fluid for a water remoistenable glue which provides rapid wetting and penetration of the surface of the glue layer. This and other objects and advantages of the invention will become apparent from the following detailed description and appended claims.

DETAILED DESCRIPTION OF THE PREFERRED EMBODIMENTS

The activator fluid of the present invention includes an effective amount of acetic acid with water. Preferably, acetic acid is present in the fluid in an amount of between about 0.04 to about 0.12% by volume, most preferably about 0.06 to about 0.08%, by volume. A preferred source of acetic acid is vinegar. Commercially available vinegars typically contain between 4-5% acetic acid by volume. Suitable vinegars for use in the practice of the present invention include distilled white vinegar, yellow vinegar, red wine vinegar, natural cider vinegar, and mixtures and combinations thereof. While acetic acid is the most preferred acid for use in the practice of the present invention, other food acids are believed also to be suitable. Suitable sources of water include deionized water, distilled water, domestic tap water, reverse osmosis water, or domestic softened water. Preferred is a deionized water in which all solids are removed by using a cation resin which removes positive charged ions, replacing them with hydrogen, and an anion resin which removes negatively charged ions, replacing them with hydroxide.

Optionally, the activator fluid may contain a small amount of fragrance to provide a pleasing scent to the fluid. Preferably from about 0.20 to about 0.60% of fragrance by volume is added to the activator fluid. Suitable fragrances include extract of lemon oil, extract of orange oil, extract of banana oil, extract of pineapple oil, extract of peppermint oil, and combinations and mixtures thereof. Such oil extracts are readily commercially available in alcohol bases. Other oil extracts as well as other fragrances are also suitable for use in the practice of the present invention.

The activator fluid may also optionally contain a small amount of coloring matter, preferably from about 0.01 to 0.1% by volume. Preferably, food grade colorings are utilized. Examples of typical food grade colorings usable in the practice of the present invention include CI Food Blue 2, CI Food Blue 1, CI Food Green 1, CI Food Green 3, CI Food Orange 8, CI Food Red 1, CI Food Red 6, CI Food Red 14, CI Food Red 17, CI Food Yellow 3, CI Food Yellow 4, and CI Food Yellow 8.

All of the preferred ingredients for the activator fluid of the present invention are known to be safe for human comsumption. Thus, while it is not anticipated that the activator fluid will be consumed, there is no danger if small amounts of it are ingested.

Likewise, because of the acidic nature of the activator fluid of the present invention, bacterial growth is minimized. Thus the preferred activator fluid is storage shelf stable, need not be refrigerated, and need not include a bacteriocide as such.

The activator fluid of the present invention is designed to be used in the fluid reservoirs of automated flap sealing and/or postage metering machines. Additionally, the fluid of the present invention may be used in manual operations such as the moistening of packaging tapes or other materials having water remoistenable glue thereon.

In order that the invention may be more readily understood, reference is made to the following example which is intended to illustrate the invention but not to limit the scope thereof.

EXAMPLE

An activator fluid for a water remoistenable glue in accordance with the present invention was made by mixing 126 ounces of deionized water, 1¾ ounces of distilled white vinegar (5% acidity), ⅜ ounces of extract of lemon oil in 80% alcohol base, and 4 drops of blue food coloring. The activator fluid was applied to the water remoistenable glue on the flap of an envelope and found to rapidly penetrate and wet the glue.

Having described the invention in detail and by reference to preferred embodiments thereof, it will be apparent that modifications and variations are possible without departing from the scope of the invention defined in the appended claims.

What is claimed is:

1. An activator fluid for a water remoistenable glue comprising from 0.4 to 0.12% acetic acid, from 0.20 to 0.60% fragrance, from 0.01 to 0.1% coloring, and the balance water, all percentages by volume.

2. The activator fluid of claim 1 in which the source of acetic acid is vinegar.

3. The activator fluid of claim 2 in which said vinegar is selected form the group consisting of distilled white vinegar, yellow vinegar, red wine vinegar, natural cider vinegar, and mixtures thereof.

4. The activator fluid of claim 1 in which said fragrance is selected form the group consisting of extract of lemon oil, extract of orange oil, extract of banana oil, extract of pineapple oil, extract of peppermint oil, and mixtures thereof.

5. An activator fluid for a water remoistenable glue comprising from 0.4 to 0.12% acetic acid, from 0.20 to 0.60% extract of lemon oil, from 0.01 to 0.1% blue food coloring and the balance water, all percentages by volume.

* * * * *